United States Patent [19]
Doyle et al.

[11] Patent Number: 4,878,605
[45] Date of Patent: Nov. 7, 1989

[54] LOAD CARRYING APPARATUS

[76] Inventors: James P. Doyle, P.O. Box 408, Wis Dells, Wis. 53965; Lyle J. Rudolph, 1132 Old Roum Rd., Cambridge, Wis. 52523

[21] Appl. No.: 121,529

[22] Filed: Nov. 17, 1987

[51] Int. Cl.⁴ .............................................. B60R 9/00
[52] U.S. Cl. ........................... 224/42.41; 224/42.46 R
[58] Field of Search .......... 224/42.41, 42.23, 42.46 R; 220/401; 211/113; 280/769; 296/37.6; 410/32, 46, 90; 414/462

[56] References Cited

U.S. PATENT DOCUMENTS

| | | | |
|---|---|---|---|
| 1,545,375 | 7/1925 | Volpert | 224/42.23 |
| 2,322,841 | 6/1943 | Foster | 280/783 |
| 2,607,518 | 8/1952 | Cohen | 224/42.41 |
| 3,240,408 | 3/1966 | Laponsie | 224/42.41 |
| 4,171,078 | 10/1979 | Morgan | 224/42.23 |
| 4,418,853 | 12/1983 | Shaffer | 224/42.41 |
| 4,564,134 | 1/1986 | Seibert | 224/42.41 |

FOREIGN PATENT DOCUMENTS 2088789  6/1982  United Kingdom .

Primary Examiner—Renee S. Luebke
Attorney, Agent, or Firm—Jacobson and Johnson

[57] ABSTRACT

A pallet carrier for carrying a load of pallets on the underside of a semi-trailer including a first flexible member to releasably support a load of pallets on the underside of a semi-trailer and a second flexible member disposed in a direction generally perpendicular to the first flexible member to stabilize the load of pallets on the underside of the semi-trailer.

2 Claims, 1 Drawing Sheet

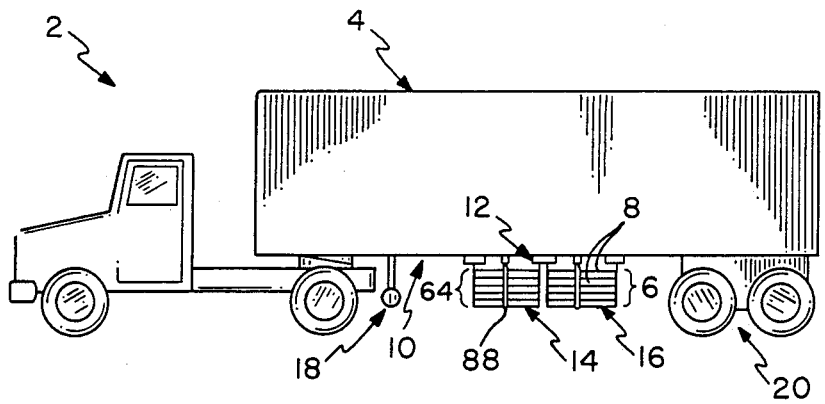
FIG. 1
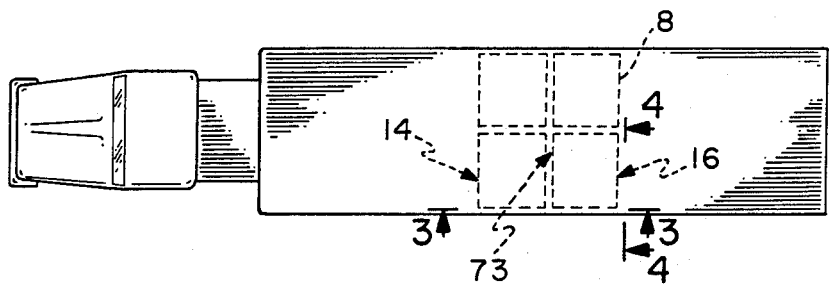
FIG. 2
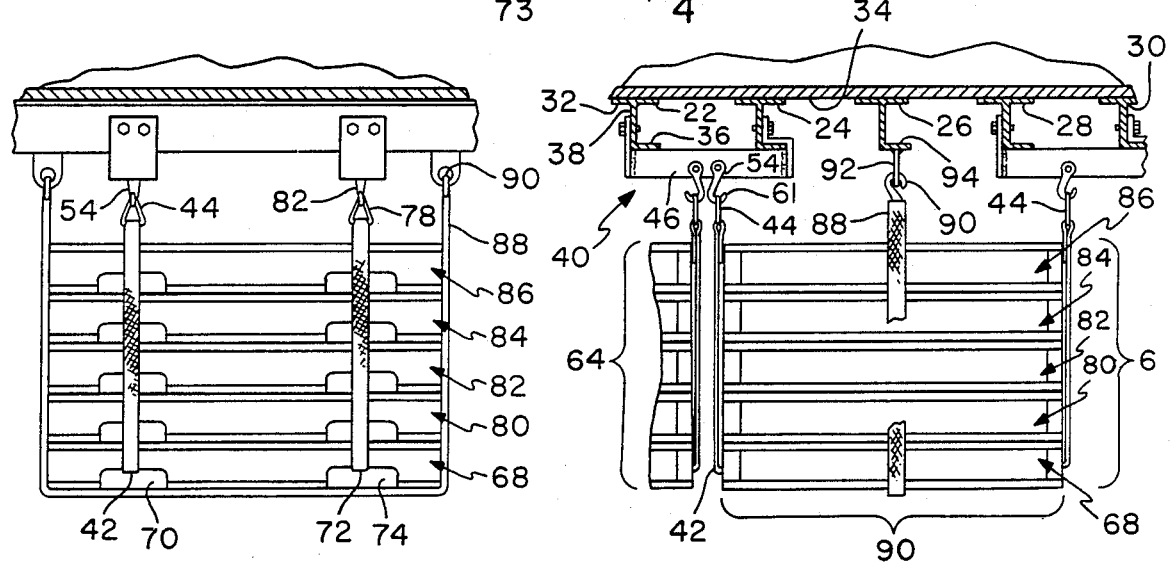
FIG. 4
FIG. 3
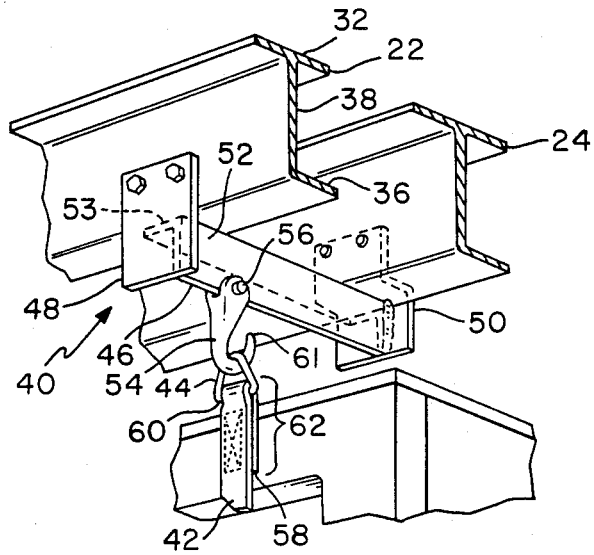
FIG. 5 ness of the present invention does not utilize any rigid fixed-dimension structure, it is considerably lighter than that taught in the prior art, and can easily be removed and stored when not in use. Additionally, storage requirements are minimal; when not in use, the present invention is easily stored in a small space inside the tractor area. Finally, the materials suitably used in the context of the present invention make it inherently economical. Other advantages and a fuller appreciation of the construction and mode of operation of the present invention will be more fully appreciated upon examination of the following detailed description of a preferred embodiment.

LOAD CARRYING APPARATUS

FIELD OF THE INVENTION

The present invention relates generally to devices used to haul pallets exteriorly of a vehicle such as a semi-trailer and, in particular, to devices designed to carry pallets on the underside of the vehicle body.

BACKGROUND OF THE INVENTION

Typically, goods transported by a semi-trailer are put on pallets to facilitate loading and unloading of the vehicle. After the transported goods have been delivered and removed from the pallets used during transportation, the truck operator is often forced to place the empty pallets back on the trailer portion of the vehicle to be returned to the location from which the goods originated. This severely limits any opportunity to use the space in a more profitable manner, such as transporting other goods for hire. Employing a device which permits the operator to haul the pallets exteriorly of the vehicle makes it possible to avoid this problem and, thus, to more efficiently utilize resources. Devices for hauling pallets outside of a vehicle are, in general, known. For example, devices which permit a truck operator to haul pallets on the underside of a semi-trailer are disclosed by U.S. Pat. Nos. 4,564,134 issued to C. Seibert on Jan. 14, 1936 and 4,418,853 issued to J. D. Shaffer on Dec. 6, 1983.

SUMMARY OF THE INVENTION

The present invention advantageously employs flexible straps or chains suspended from the underside of a vehicle. In a preferred embodiment of the invention, three such straps are utilized for each set of five pallets to be carried. Specifically, one end of each of two of the straps is attached to the underside of the vehicle. The two straps are then placed under a first pallet in the slots formed on the bottom of the pallet (the slots are commonly employed to facilitate a forklift). The other end of each strap is then lifted and suspended from the underside of the vehicle at a point approximately the width of the pallet away from the first attachment point. Once the first of the pallets is in place, it will serve as a platform upon which one to four additional pallets may be loaded. Many semi-trailers are large enough to accommodate four such five-pallet configurations, making it possible to haul up to 20 empty pallets at any given time. Larger vehicles may be capable of accommodating additional sets of pallets. For example, a vehicle long enough to accommodate six groups of five pallets could transport up to thirty empty pallets. The third strap extends between the front and rear ends of the pallet stack, perpendicular to the first two straps, and is used to prevent unwanted lateral motion during transport.

The apparatus of the present invention addresses several problems which have commonly been associated with similar devices. Specifically, because the load-carrying component of the present invention does not utilize any rigid fixed-dimension structure, it is considerably lighter than that taught in the prior art, and can easily be removed and stored when not in use. Additionally, storage requirements are minimal; when not in use, the present invention is easily stored in a small space inside the tractor area. Finally, the materials suitably used in the context of the present invention make it inherently economical. Other advantages and a fuller

BRIEF DESCRIPTION OF THE DRAWINGS

A preferred exemplary embodiment of the present invention will hereinafter be described in conjunction with the appended drawing, wherein like numerals denote like elements, and:

FIG. 1 is a side elevation view of a load carrying apparatus in accordance with the present invention when attached to the underside of a semi-trailer;

FIG. 2 is a top plan view of a truck employing the preferred exemplary embodiment of the present invention;

FIG. 3 is a sectional front view of the load carrying apparatus shown in FIG. 2;

FIG. 4 is a sectional side view of the load carrying apparatus shown in FIG. 2; and FIG. 5 is a partial perspective view of the region of the underside of the vehicle to which the load carrying apparatus is attached.

DETAILED DESCRIPTION OF THE PREFERRED EXEMPLARY EMBODIMENT

Referring to FIGS. 1 and 2, a truck 2 is coupled to a semi-trailer 4. Stacks 6 of pallets 8 are secured to the underside 10 of semi-trailer 4 by a load carrying system 12 according to the present invention. As shown in FIG. 2, a series of rows 14, 16 of two stacks 6 each may be secured to underside 10 in a generally central position between front jack stands 18 and rear wheels 20 of semi-trailer 4.

As illustrated in FIGS. 3-5, trailer underside 10 has a series of parallel, spaced-apart support beams 22, 24, 26, 28, 30 transversing to the longitudinal axis of the truck. Beams 22-30 each include an upper horizontal wall 32 disposed adjacent the surface of trailer floor 34, a lower horizontal wall 36 and a central vertical wall 38 spanning upper and lower horizontal walls 32,36.

The preferred embodiment of the present invention comprises a bracket, generally indicated as 40 in FIG. 5, rigidly secured to adjoining transverse support beams 22, 24; and a flexible strap 42 having a triangular ring 44 reinforceably affixed to each end thereof.

Bracket 40 suitably comprises an elongated L-shaped beam 46 interposed between parallel opposing end flanges 48, 50, and permanently secured to the end flanges to form a unitary structure. Beam 46 suitably includes a vertical leg 52, and a horizontal leg 53. One or more downwardly depending hooks 54 are preferably pivotably mounted on a pin 56 disposed through a receiving aperture (not shown) in leg 52. In the context of the preferred embodiment, hook 54 is disposed for cooperative engagement with triangular ring 44. Those skilled in the art will appreciate that any suitable coupling means, such as a pair of opposed cooperatively engaging hooks, may be employed to effect the same function. As previously stated, bracket 40 is suitably rigidly secured to adjoining transverse support beams 22, 24. End flanges 48, 50 are suitably fixed, e.g., by one or more bolts, to the central vertical wall of support beams 22, 24, respectively. Flexible strap 42 is preferably made of a light-weight material, such as nylon, and is suitably dimensioned to accommodate five pallets when stacked one on top of another as best viewed in FIGS. 3 and 4. Accordingly, strap 42 is preferably 89" in length and 1" to 3" wide.

As previously noted, triangular ring 44 is reinforceably attached to each end of strap 42. FIG. 5 shows that this may be accomplished, for example, by inserting an end 58 through a bottom portion 60 of ring 44 and then fastening a length 60 of the strapping material sufficient to provide reinforcement to a corresponding opposite length by any suitable means, e.g., stitching.

With specific reference to FIGS. 3 and 5, transverse support beams 22, 24, 26, 28, and 30, forming the support structure of the semi-trailer, are spaced a fixed distance apart, typically between 12 inches and 18 inches. Most commonly, these beams are of the type ordinarily referred to as I-beams (not shown) or J-type beams (shown in FIGS. 3 and 5). Pairs of successive transverse support beams, e.g., 22, 24, and 28, 30, are employed to effect proper spacing between successive pairs of hooks 54, and to prevent the beams from becoming dislodged or from bowing under the weight of the pallets. In practice, four brackets are preferably used to support each stack 6 of five pallets. A single bracket, however, disposed between adjoining stacks of pallets 6, 64 may be shared, as best viewed in FIG. 3.

With particular reference to FIGS. 3 and 4, a method of loading pallets 6 will now be more fully described. Triangular ring 44 is first slipped onto an upwardly directed portion 61 of hook 54, best seen in FIGS. 3 and 5. A first pallet 68 is then disposed overlaying strap 42 at a slot 70, which is ordinarily used for receiving one of the forks of a forklift (not shown). A second triangular ring (not shown) of a second strap 72 is then attached to a receiving hook of a second bracket (not shown) at a position generally indicated as 73 in FIG. 2. Strap 72 is then positioned under pallet 68 through a second slot 74, in a manner similar to that described above in conjunction with strap 42. Triangular rings 44, 78, which form the distal ends of straps 42, 72, respectively, are then slipped onto hooks 54, 82, as best viewed in FIG. 4. In the context of the preferred embodiment, triangularly-shaped rings are employed to advantageously facilitate loading of the first pallet in the manner described above. More specifically, such a configuration of hooks and rings permits a single operator to secure the first pallet into position without assistance. Additionally, the coupling mechanism described in combination with the fixed length straps further described below, avoids the necessity of providing a ratcheting mechanism or the like to lift the first pallet into position.

As noted above, a strap having an 89" length is preferably used in the context of the preferred embodiment of the present invention. When straps of that length are attached in the manner described above, pallet 58 will be lifted from the ground a sufficient distance to permit adequate ground clearance while semi-trailer 4 is in transit. Once pallet 68 has been positioned in the manner described above, one to four additional pallets, generally referred to as 80, 82, 84, and 86, may be stacked on top of first pallet 68 to form a configuration of five pallets as best seen in FIGS. 3 and 4.

Straps 42, 72 perform the load bearing function of the present invention. A third strap, stabilizing strap 88, (shown in FIGS. 1, 3 and 4) is employed to prevent pallets 68, 80, 82, 84, and 86 from shifting or becoming dislodged during transit. Stablizing strap 88 suitably comprises a hook 90 reinforcing attached to opposite ends of strap 88, and is preferably 162" in length and between 1" and 3" wide. Hook 90 is releasably engaged to a suitable coupling mechanism 92 for securing the hook to the underside 10 of vehicle body 4, associated with transverse support beam 26, as shown in FIG. 3. Because the function of stablizing strap 88 is limited to preventing undesired movement of stack 6 and does not, therefore, provide any part of the load-bearing function, a single transverse support beam may be employed. Hook 90 (and the hook (not shown) at the opposite end of stabilizing strap 88) may be coupled to beam 26 by any suitable releasable coupling mechanism. For example, a hole may be drilled into a lower horizontal wall 94 of beam 26 and used to receive hook 90. Alternatively, a downwardly directed hook may be employed in conjunction with coupling mechanism 92; in that instance, a ring may be affixed to each end of stabilizing strap 88. In the context of the preferred invention, transverse support beam 26 may be disposed between beams 22, 24, 28, 30, as best shown in FIG. 3, so that strap 88 engages stack 6 at a point approximately one-half the width 90 of the pallets forming the stack. A second hook (not shown) associated with strap 88 may then be coupled to a second bracket (also not shown), which preferably is also rigidly secured to transverse support beam 26, to complete the five pallet (stack 6) configuration. Once stack 6 has been loaded in this manner, it may be transported.

As shown in FIGS. 1 and 2, four groups of five pallets may be accommodated by the device of the present invention at any given time. Each group of five is mounted in a manner similar to that described above. When each group of five pallets (twenty in all) are properly positioned in the manner described above, they will appear (top plan view) as shown in FIG. 2. In practice, the number of pallet stacks which can be accommodated is a function of the size of the vehicle. A larger vehicle (not shown), for example, may be able to transport six or more pallet stacks; in this manner, thirty or more pallets may be transported. The above description is of a preferred embodiment of the present invention, and the invention is not limited to the specific form shown. Modification may be made to the design, arrangement or materials used in the description of the present invention without departing from the spirit thereof as expressed in the appended claims.

What is claimed:

1. Apparatus for carrying a load of pallets on the underside of a semi-trailer, said apparatus comprising: a series of brackets disposed on the underside of said semi-trailer in spaced-apart relation; means for rigidly securing said brackets to said semi-trailer; a first flexible strap having a first end and a second end said first flexible strap having rings reinforcingly attached to said first and second end of said first flexible strap; means for releasably securing said first end of said first strap and said second end of said first strap to a pair of said brackets, said means for releasably securing having a first downwardly directed hook coupled to a first bracket and a second downwardly directed hook coupled to a second bracket positioned a mounting-effective distance from said first bracket, said first flexible strap operable for supporting a load of pallets on the underside of said semi-trailer; a second flexible strap, said second flexible strap disposed in a direction generally perpendicular to said first strap to stabilize said load of pallets on the underside of said semi-trailer.

2. Apparatus for carrying a load of pallets on the underside of a semi-trailer, said apparatus comprising: a series of brackets disposed on the underside of said semi-trailer in spaced-apart relation; said brackets including a pair of opposing end flanges, a beam rigidly disposed between said opposing end flanges, an aperture formed in said beam, a pin disposed in said aperture, and a downwardly directed hook mounted on said pin; means for rigidly securing said brackets to said semi-trailer; a first flexible strap having a first end and a second end; means for releasably securing said first end of said first strap and said second end of said first strap to a pair of said brackets, said first flexible strap operable for supporting a load of pallets on the underside of said semi-trailer; a second flexible strap, said second flexible strap disposed in a direction generally perpendicular to said first strap to stabilize said load of pallets on the underside of said semi-trailer.

* * * * *